United States Patent [19]

Stifle et al.

[11] 3,746,794

[45] July 17, 1973

[54] MODULATOR-DEMODULATOR APPARATUS FOR COMMUNICATION OF DIGITAL DATA OVER VOISE GRADE TELEPHONE LINES

[75] Inventors: Jack Stifle, Paxton; Michael Johnson, Champaign, both of Ill.

[73] Assignee: University of Illinois Foundation, Urbana, Ill.

[22] Filed: July 7, 1971

[21] Appl. No.: 160,429

[52] U.S. Cl. ............... 179/2 DP, 178/66 R, 325/30, 325/320

[51] Int. Cl. ............................................ H04m 11/06

[58] Field of Search ............................ 178/66 R, 58; 325/30, 320; 179/2 DP

[56] References Cited

UNITED STATES PATENTS

| | | | |
|---|---|---|---|
| 3,165,583 | 1/1965 | Kretzmer | 325/30 |
| 3,293,607 | 12/1966 | Kalbfell | 325/30 |
| 3,555,428 | 1/1971 | Perreault | 325/320 |
| 3,417,332 | 12/1968 | Webb | 178/66 R |
| 3,514,702 | 5/1970 | Nahay | 325/30 |
| 3,614,639 | 10/1971 | Belman | 325/320 |

*Primary Examiner*—Kathleen H. Claffy
*Assistant Examiner*—Thomas D'Amico
*Attorney*—Nate F. Scarpelli, Charles J. Merriam, William A. Marshall, Norman M. Shapiro, Jerome B. Klose, Basil P. Mann, Clyde V. Erwin, Jr., Alvin D. Shulman, Edward M. O'Toole, Allen H. Gerstein, Owen J. Murray and Donald E. Egan

[57] ABSTRACT

A data modem (modulator-demodulator) apparatus for transmitting and receiving digital data over voice grade telephone lines having a multivibrator, a two station counter providing frequencies $f_0$ and $f_1$ with 2/1 ratios, composite signal generator responsive to the $f_0$ and $f_1$ signals to provide a pulse train comprising an integral number of cycles of $f_0$ and $f_1$, wherein one cycle of $f_1$ is provided for each binary one in the incoming digital data signal and two cycles of $f_0$ are provided for each binary zero in the incoming digital data signal, filter means for transforming the pulse train into an approximation of a sine wave for coupling over a voice grade telephone line, means for receiving the sine wave containing information, a limiting amplifier and digital comparator for converting the sine wave back into a digital signal, a two stage counter providing an output zero for each pair of pulses in the digital signal, an integrator-comparator providing an output one level for each single cycle of $f_1$, and means for combining outputs from the integrator-comparator and the two stage counter to provide the reconstructed digital data signal.

3 Claims, 3 Drawing Figures

INVENTORS
Jack Stifle
Michael Johnson
BY
Merriam, Marshall, Shapiro & Klose
ATTYS.

INVENTORS
Jack Stifle
Michael Johnson
BY
Merriam, Marshall, Shapiro & Klose
ATTYS.

MODULATOR-DEMODULATOR APPARATUS FOR COMMUNICATION OF DIGITAL DATA OVER VOISE GRADE TELEPHONE LINES

This invention relates to data processing apparatus, and particularly to data modem (modulator-demodulator) apparatus which can transmit and receive digital data over voice grade telephone lines.

The University of Illinois has been involved in the development of computer-aided instruction (CAI) systems known as PLATO (Programmed Logic for Automatic Teaching Operations, as shown in U.S. Pat. No. 3,405,457. due to the expected large number of terminals to be served by the computer, a significant part of the PLATO effort has been directed at the development of a low cost student terminal capable of communicating with a computer via voice grade telephone lines. The terminal requires a modem capable of transmitting and receiving data at rates up to 1200 bits per second.

It was apparent very early in the design of the terminal that commercially available modems were economically incompatible with the concept of a low cost terminal. A 1200 bps modem, for example, typically sells for $400 to $700. Such prior art modems quickly become economically undesirable in systems 1nvolving a large number of terminals.

SUMMARY OF THE INVENTION

In accordance with the present inventon there is provided a reliable, low cost data modem for use in data terminals in communicating with a computer over voice grade telephone lines.

Three basic factors governed the design philosophy.

1. Use digital processing techniques wherever possible. Digital techniques are inherently more reliable and can be instrumented using low cost integrated circuits.
2. Elimination of all circuits involving functions not actually required. The modem described here is designed for full-duplex operation and is assumed to always be ready to transmit or receive data. All crcuits, therefore, involving Data Set Ready, Request-to-Send, Clear-to-Send, and timing circuits associated with line turn around can be eliminated. In addition an FSK (frequency shift keying) technique is used in which the carrier signal is always present thus eliminating a carrier detection circuit.
3. Interfacing directly to TTL logic thereby eliminating all voltage level shifting circuits.

DETAILED DESCRIPTION

Figure 1:
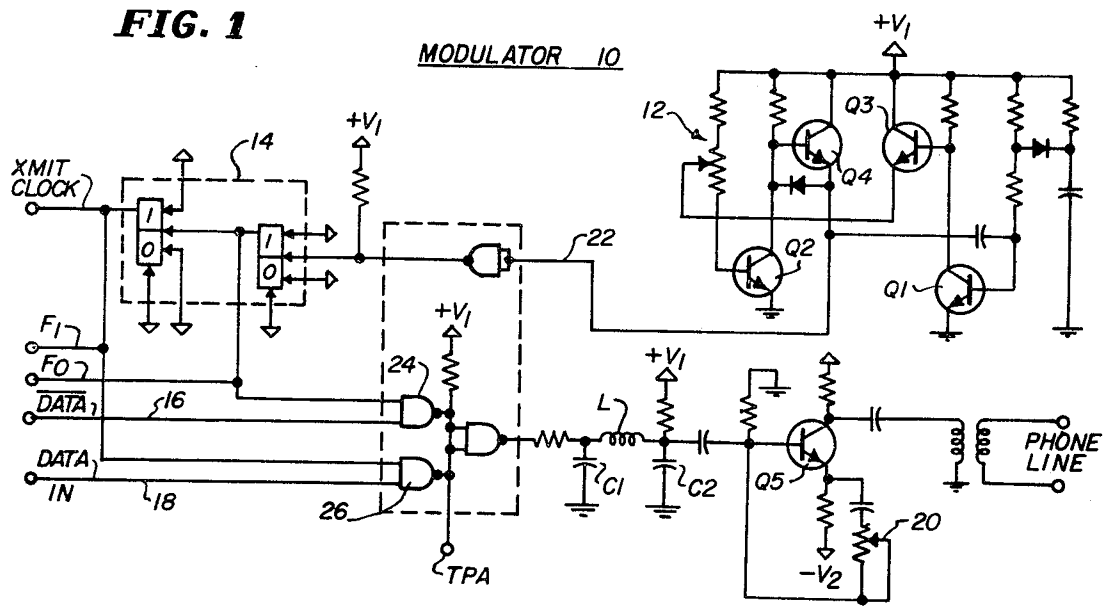
FIG. 1 is a schematic diagram of the modulator constructed according to the invention for receiving digital data at the terminal for transmission over a voice grade telephone line.
Figure 2:
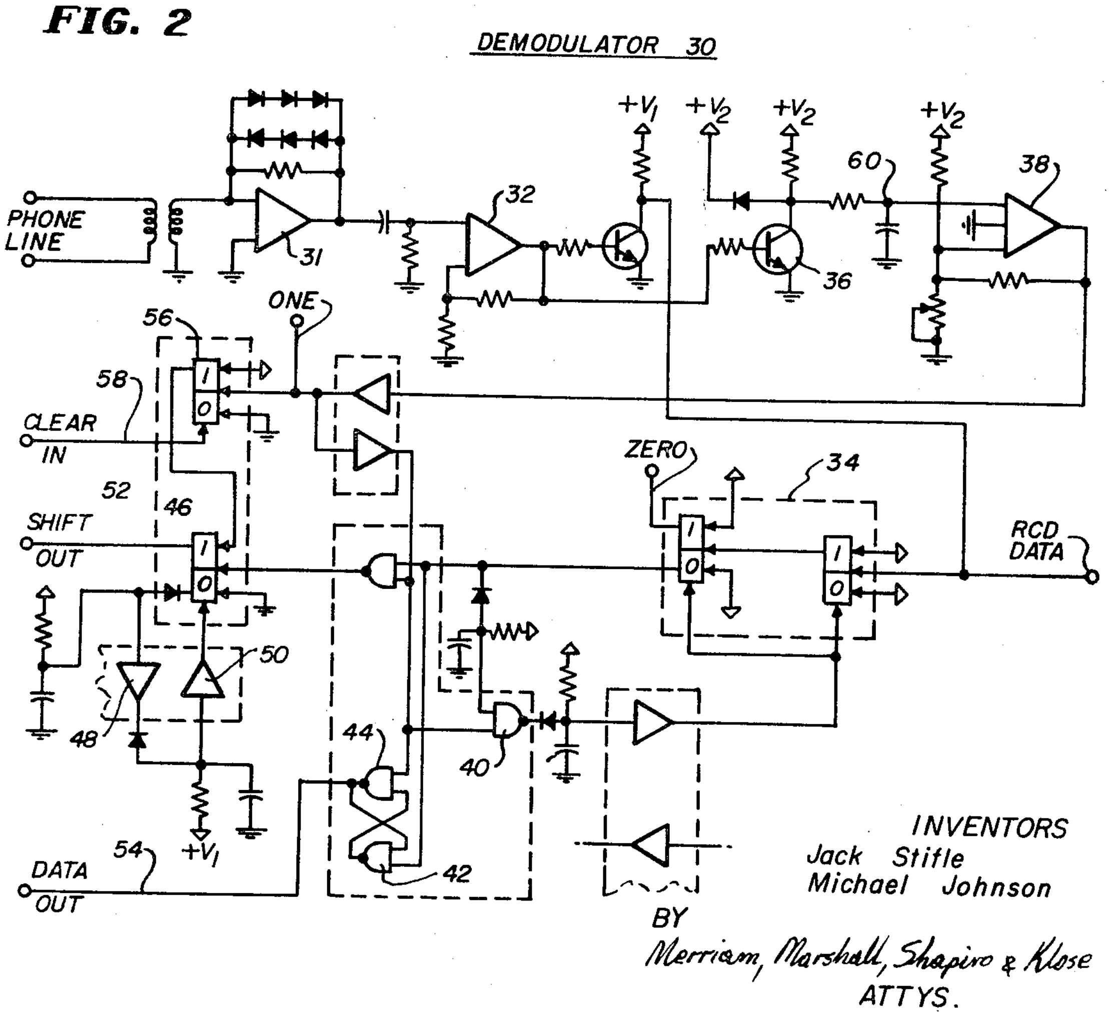
FIG. 2 is a schematic diagram of the demodulator constructed according to the invention for receiving digital data from the computer over telephone lines for input to the terminal.
Figure 3:
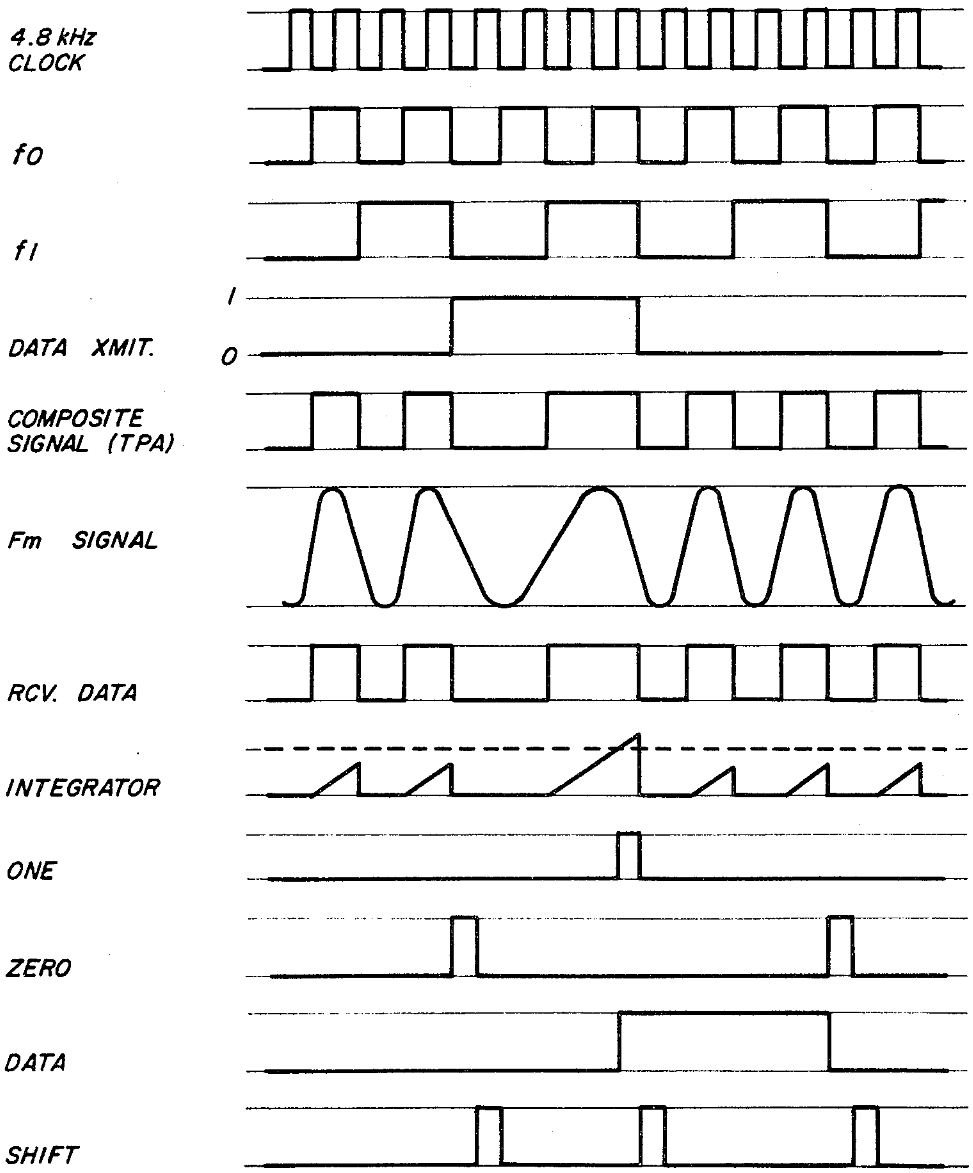
FIG. 3 is an illustraton of the signals present at respective portions of the apparatus shown in FIGS. 1 and 2.

Reference may now be made to FIGS. 1-3 wherein there is illustrated the details of a data modem according to the invention. In the modulator 10 shown in FIG. 1, a 4.8 KHZ multivibrator 12 is used to drive a two-stage counter 14 which acts as a frequency divider providing both 2400 hertz ($f_0$) and 1200 hertz ($f_1$) signals. The counter elminates any asymmetry considerations from the oscillator and at the same time guarantees an exact 2/1 ratio between frequencies $f_0$ and $f_1$ which simplifies recovery of data in the receiver. The 1200 hertz signal is used as a transmit clock and controls the flow of data into the modulator. The data is assumed to reside in a shift register (not shown) at the terminal which is loaded and emptied under control of the transmit clock. Incoming data from the shift register to the modulator 10 is presented on data lines 16, 18. The data signals change only on the negative going edge of the transmit clock thus 1nsuring that the composite signal contains an integral number of cycles of $f_0$ or $f_1$. A binary "one" selects one cycle of $f_1$ while a "zero" selects two cycles of $f_0$.

The composite signal is passed through a low pass filter ($C_1$, $C_2$, L) which removes all high frequency components and transforms the signal into an approximation of a sine wave. The signal is then amplified by $Q_5$ and delivered to the phone line. The gain adjustment 20 allows signals up to +6dbm to be generated (0dbm = 1 mw/600 ohms).

With reference to FIG. 3, there is illustrated the respective signals present at various locations in th apparatus of FIGS. 1 and 2. The 4.8 KHZ clock is provided on line 22 and coupled to the counter 14. The 2400 hz ($f_0$) and 1200 hz ($f_1$) signals are present at the indicated lines at the output of counter-frequency divider 14. Incoming data from the shift register (not shown) of the associated terminal comes in on data lines 16, 18 and the illustrated "Xmit Data" in FIG. 3 is an example of such digital data input. The "Composite Signal" shown in FIG. 3 is provided at reference point TPA (see FIG. 1), and results from the clocked "Xmit Data" input into respective AND gates 24,26. The illustrated "FM signal" in FIG. 3 represents the transformed two digital data inputs into a signal which can be transmitted over the voice grade phone 1ine.

In the demodulator 30, shown in FIG. 2, the incoming signal from the phone line is passed through a limiting amplifier 31 and digital comparator 32 which converts the "FM Signal" sine wave back into a digital signal "Rcv. Data." The signal is then delivered simultaneously to a two-stage counter 34 and an integrator 36-comparator 38. The integrator 36-comparator 38 removes the higher frequency pulses ("zeros"). The counter 34 provides an output for each pair of pulses. However, since a "one" output from the integrator 36-comparator 38 will clear the counter, via gate 40, the counter 34 will provide an output only following two short pulses or a "zero." The counter thus becomes a "zeros" detector while the integrator 36-comparator 38 is a "ones" detector.

The outputs of the integrator 36-comparator 38 and the counter 34 set the data flip-flop 42, 44 to the appropriate state and trigger the shift pulse circuit composed of the shift flip-flop 46 and gates 48, 50. The data flip-flop is set on the leading edge of the data signals while the shift pulse is generated on the trailing edge thus insuring that the state of the data line is established in advance of the shift pulse. The shift pulse on output line 52 and data line 54 are then used by a shift register (not shown) in the associated terminal to input the data.

In the system described here a binary "one" is used to indicate the start of a message. Thus the first bit in a message sets the start flip-flop 56 which allows the remaining bits in the message to trigger the SHIFT flip-flop 46 and generate shift pulses. The external terminal euuipment counts the shift pulses, and following receipt of the last message bit issues a clear signal coupled to line 58 which resets the start flip-flop 56 inhibiting the generation of shift pulses until the next message arrives.

Referring again to FIG. 3, in the lower portion thereof there is illustrated the respective signals present at various portions of the demodulator 30. The "Rcv. Data" signal in FIG. 3 is the re-transformed digital signal provided following the output of comparator 32. The "integrator" sawtooth signal is provided at reference point 60 following integrator 36. The "One" and "Zero" signals are present at the indicated respective locations in FIG. 2. The indicated "Data" signal is present on line 54 and the "Shift" signal is present on line 58. It is to be understood that such signals have been illustrated merely as examples and for convenience in describing the invention.

It may be noted that there are no delay equalizing circuits present in the demodulator of FIG 2. The reason for the omission is that the illustrated modems are used where the distances involved are less than five miles. Over such a short haul no delay equalization is required. However, where longer distance operatlon is required, suitable equalizing networks could be added in the demodulator at the front end of the limiting amplifier 31.

Both the modulator and demodulator when constructed each fit nicely on a 3 × 4 ½ inch printed circuit board. The total parts costs for constructing the modem described here is less than $70.

The forms of invention herein shown and described are to be considered only as illustrative. It will be apparent to those skilled in the art that numerous modifications may be made therein without departure from the spirit of the invention or the scope of the appended claims.

What is claimed is:

1. Modulator-demodulator apparatus for transmitting and receiving digital data over voice grade telephone lines, said apparatus comprising:
an oscillator for providlng a pulse train with a substantially constant repetition frequency, $f_x$;
a frequency divider coupled to said oscillator for providing a first pulse train signal with a repetition frequency, $f_o$, equal to $f_x/2$, and a second pulse train signal with a repetition frequency, $f_1$, equal to $f_x/4$;
means for receiving an incoming digital data signal;
composite signal generator means responsive to said $f_o$ and $f_1$ signals and to said incoming digital data signal for providing a composite pulse train signal comprising an integral number of cycles of $f_o$ and $f_1$;
filter means coupled to said composite signal generator means for transforming said composite pulse train signal into a frequency modulated sine wave like waveform having a frequency modulated in accordance with said digital data;
means for coupling said frequency modulated sine wave like waveform to said voice grade telephone line;
means for receiving said frequency modulated sine wave like waveform from said telephone line;
means for reconverting said frequency modulated sine wave like waveform into said composite pulse train signal comprising an integral number of cycles of said higher repetition frequency, $f_o$, and said lower repetition frequency, $f_1$;
a counter responsive to said composite pulse train;
said counter including means for directly providing at the output thereof a first output signal level in response to each consecutive pair of cycles of said higher repetition frequency, $f_o$;
an integrator-comparator responsive to said composite pulse train;
said integrator-comparator including means for directly providing at the output thereof a second output signal level in response to each cycle of said lower repetition frequency, $f_1$; and
a flip-flop directly coupled to the respective outputs of said counter and said integrator-comparator for receiving said respective outputs therefrom and responding thereto to reconstruct said digital data signal.

2. Apparatus as claimed in claim wherein whlrein said incoming digital data signal comprises binary one and zero data bits.

3. Apparatus as claimed in claim 2, wherein said composite signal generator means provides one cycle of said frequency, $f_1$, for each binary one in said digital data signal and two cycles of said frequency, $f_o$, for each binary zero in said digital data signal.

* * * * *

PO-1050
(5/69)

UNITED STATES PATENT OFFICE
CERTIFICATE OF CORRECTION

Patent No. 3,746,794 Dated July 17, 1973

Inventor(s) Jack Stifle, et al.

It is certified that error appears in the above-identified patent and that said Letters Patent are hereby corrected as shown below:

In Title: "Voise" should be --Voice-- (both occurrences)

Col. 1, line 12; after "Operations" insert --)--.

Col. 1, line 13, "due" should be --Due--.

Col. 1, lin3 26, "1nvolving" should be --involving

Col. 1, line 41, "crcuits" should be --circuits--.

Col. 1, line 60, "illustraton" should be --illustration--.

Col. 2, line 15, "1nsuring" should be --insuring--.

Col. 2, line 28, "th" should be --the--.

Col. 2, line 42, "1ine" should be --line--.

Col. 3, line 6, "euuipment" should be --equipment--.

Col. 3, line 29, "operat1on" should be --operation--.

Col. 3, line 47, "provid1ng" should be --providing--.

Col. 4, line 41, "claim wherein" should be --claim 1, wherein--.

Col. 4, line 41, delete "wh1rein".

Signed and sealed this 16th day of April 1974.

(SEAL)
Attest:

EDWARD M.FLETCHER,JR.
Attesting Officer

C. MARSHALL DANN
Commissioner of Patents